United States Patent [19]
Helletsberger et al.

[11] 4,278,449
[45] Jul. 14, 1981

[54] METHOD FOR IMPROVING THE QUALITY OF ABRASIVE GRAINS

[75] Inventors: Harald Helletsberger, Wattens; Anton Aichhorn, Thaur; Erich Bogusch, Schwaz, all of Austria

[73] Assignee: Tyrolit-Schleifmittelwerke Swarovski K.G., Austria

[21] Appl. No.: 101,004

[22] Filed: Dec. 6, 1979

[30] Foreign Application Priority Data

Feb. 7, 1979 [AT] Austria ................................ 901/79

[51] Int. Cl.³ .......................... B24D 3/02; B24D 3/14
[52] U.S. Cl. ...................................... 51/309; 51/295; 51/307; 51/308
[58] Field of Search .................. 51/295, 308, 307, 309

[56] References Cited

U.S. PATENT DOCUMENTS

| 2,730,439 | 1/1956 | Houchins | 51/308 |
| 2,782,110 | 2/1957 | Cantrell | 51/308 |
| 3,525,600 | 8/1970 | Yoshikawa et al. | 51/295 |
| 3,702,758 | 11/1972 | Fukui et al. | 51/309 |
| 3,847,568 | 11/1974 | Cihon et al. | 51/308 |

Primary Examiner—Donald E. Czaja
Assistant Examiner—W. Thompson
Attorney, Agent, or Firm—McGlew and Tuttle

[57] ABSTRACT

Abrasive grain, corundum ($Al_2O_3$) comprising titanium oxide, preferably $Ti_2O_3$, is provided with a ceramic coating. The abrasive grain is subjected to a heat treatment whereby the Ti-oxides change from the trivalent into the quadrivalent degree of oxidation. The coating and the change of the degree of oxidation are effected simultaneously.

16 Claims, 1 Drawing Figure

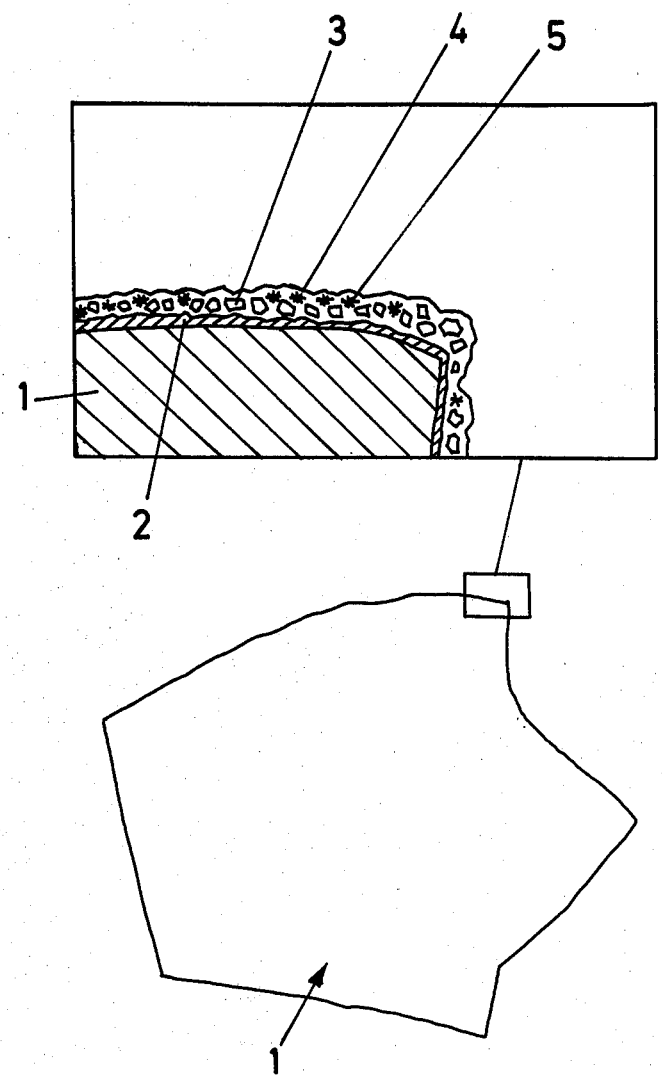

METHOD FOR IMPROVING THE QUALITY OF ABRASIVE GRAINS

BACKGROUND OF THE INVENTION

1. Field of the Invention

The invention relates to a method for improving the quality of abrasive grains of $Al_2O_3$ comprising titanium oxide, preferably $Ti_2O_3$, whereby a ceramic coating is applied, e.g. melted and/or sintered, onto the abrasive grain.

The invention also relates to the treatment of conventional abrasive grains of molten or sintered electrocorundum, which are commercially available as normal corundum or microcrystalline corundum and contain between 0.5 and 5.0 weight percent of titanium oxide ($Ti_2O_3$ and $TiO_2$), the chief constituent being $Ti_2O_3$.

2. Description of the Prior Art

Corundum, which is to be used as an abrasive means in abrasive articles, such as abrasive disks, is, according to prior art methods, occasionally annealed at a temperature of about 1350° C., whereby the grain structure is changed and the abrasive properties are improved. This treatment shows in the blue colour which the corundum takes on in the course of this treatment.

It is further known in the art to provide corundum grains with a coating, e.g. of ceramic materials and ferric oxides, producing an improved adhesion between the abrasive grain and the bond in the abrasive article resp. having filler properties and taking an active part in the abrasive process, e.g. by improving the heat removal.

In prior art methods the abrasive grain is annealed and coated in two separate operating cycles. First the abrasive grain is heated in oxidizing atmosphere to a temperature of about 1350° C. until it takes on blue colour and then the abrasive grain is cooled off again to room temperature. After cooling off, a ceramic coating is applied onto the abrasive grain in a separate operating cycle, said coating being based on phosphates or silicates with low-melting, ceramic frits (glass frits) and fine ground metallic oxides—preferably $Fe_2O_3$ for cost saving reasons. For this purpose the abrasive grain is heated again to a temperature of about 600° C. to 800° C.

The thus obtained coating creates a greater surface and a better surface wettability due to its rough, granular surface structure. Consequently, a greater and improved adhesive surface is provided for the resinoid bond of the abrasive article, whereas the adhesion between the abrasive grain and the coating is frequently not as intense as required. When abrasive grains treated in the above-described manner are inserted into the abrasive article, grains break off easily, which have not or only insufficiently been utilized in the abrasive process, particularly in the case of abrasive disks of high density. A further reason for the breaking off of abrasive grains is the porous and relatively thick (15–50 $\mu$m) coating itself which is only of low strength. The liquid constituent of the resinoid bond is not always able to soak the thick coating entirely, i.e. to its bottom. Therefore, the porous coating itself forms a preferred fracture zone in the course of subsequent stress. Even if good adhesion is obtained between the coating and the grain and between the coating and the bond, the coating itself can be torn, whereby one part of the coating adheres to the grain, and the other part adheres as corresponding part to the binding material of the abrasive article.

SUMMARY OF THE INVENTION

The above-mentioned annealing process, i.e. the heating of the abrasive grain to a temperature of about 1350° C., alters the fracture behaviour and the strength properties of the abrasive grain and increases the abrasive capacity of the finished abrasive tool. It also guarantees a cooler grinding. The change from brown into blue and the modified mechanical properties are due to the change of the titanium from the trivalent into the quadrivalent degree of oxidation. A maximum of 5% by weight of titanium in the form of oxides (particularly $Ti_2O_3$) is contained in the abrasive grain of the present invention. This rise in the degree of oxidation from $Ti^{3+}$ to $Ti^{4+}$ effects the "precipitation" of the $Ti_2O_3$, which is "dissolved" in the $Al_2O_3$ in the form of $TiO_2$.

It is the object of the present invention to provide a method in which the annealing process, which effects the change in the grain structure, and the coating of the grain, e.g. with a layer improving adhesion, are carried out in one operating cycle and which allows a reduction in the consumption of energy.

According to the invention this is achieved by exposing the abrasive grain to a temperature between 1250° and 1350° C. over a period of between 15 minutes and 2 hours, whereby the ceramic coating is sintered resp. melted onto the abrasive grain simultaneously with the change of the Ti-oxides from the trivalent into the quadrivalent degree of oxidation, and thus simultaneously with the change in the grain structure.

The coating of the abrasive grain treated in accordance with the method of the present invention has a thickness of only 2–5 $\mu$m. Said coating is characterized by an extremely great adhesion to the grain surface and great internal strength, which is due to an intermediate layer made of spinel, for example. Apart from the energy-saving effect as compared to conventional methods, the coating applied onto the abrasive grain in accordance with the present invention has the great advantage of an extraordinary adhesion to the grain, high internal strength and reduced thickness.

DESCRIPTION OF THE PREFERRED EMBODIMENTS

It is preferably provided that the period of the heat treatment lies between 20 minutes and 45 minutes.

It is further preferably provided that the coating materials are silicates, clay, kaolin and/or high-melting glass frits.

A further preferred embodiment of the present invention provides that metallic oxides, e.g. ferric oxides and/or manganese oxides and/or chromium oxides, are admixed to the coating material resp. contained therein.

At burning temperatures of between 1250° and 1350° C. the controlled use of metallic oxides effects the separation of oxygen in accordance with the following example:

$$MeO_2 \rightarrow MeO + \tfrac{1}{2}O_2$$

In the present embodiment the oxygen is always set free immediately at the grain surface, and consequently the oxidation of the trivalent titanium is considerably accelerated by the nascent oxygen. This additional oxygen supply allows a reduction of the burning period by up to 50% as compared to conventional annealing methods.

It is preferably provided that the metallic oxide constituent amounts to about 1-5% by weight referred to the amount of abrasive grain.

A further embodiment of the present invention provides that substances, e.g. $ZrO_2$, are admixed to the coating material, which have a coefficient of expansion varying from the coefficient of expansion of the ceramic material (and the abrasive grain) as much as possible.

By adding zirconium corundum, for example, whose high thermal change in volume, when being cooled off after the burning process, produces a fine mesh of microcracks, a greater coating surface and an increase in the tensile- and bending strength of the coating and, thus, occasionally of the abrasive grain, are obtained, as said microcracks prevent the formation of great cracks.

A particularly preferred embodiment of the present invention in which the adhesion between the abrasive grain and the resinoid bond of the abrasive disk is substantially improved provides that between 0.5 and 1.5 weight percent, preferably 1.1 weight percent, of SiC referred to the amount of grain are admixed to the coating material.

Said admixture effects that the SiC decomposes resp. oxidizes already at temperatures from 900° C. onwards. An optimum degree of decomposition is obtained at the temperatures applied in the treatment of the grain in accordance with the present invention, i.e. 1250°-1350° C. Gaseous carbon dioxide resp. carbon monoxide and SiO resp. $SiO_2$ are produced in the course of said decomposition, whereby the gaseous carbon oxides create blisters in the molten material of the coating. Said blisters produce an obvious improvement in the coating surface and, consequently, an increased external adhesive surface on the abrasive grain and an improved adhesion of the coated abrasive grain in the binding material.

In accordance with the present invention the following substances, either alone or in mixtures, are, for example, used as a coating material:

| Kaolin, preferably composed as follows | | Glass frits, preferably composed as follows | |
|---|---|---|---|
| annealing loss | 13,0% by weight | in general | |
| $SiO_2$ | 46,6 by weight | $SiO_2$ | 45-70% by weight |
| $Al_2O_3$ | 37,8 by weight | $Al_2O_3$ | 7-15 by weight |
| $Fe_2O_3$ | 0,6 by weight | $B_2O_3$ | 0-25 by weight |
| $K_2O$ | 1,0 by weight | MgO | 0-3,5 by weight |
| $Na_2O$ | 0,2 by weight | CaO | 0-7 by weight |
| CaO | 0,3 by weight | $Na_2O$ | 0-5 by weight |
| MgO | 0,2 by weight | $K_2O$ | 0-12 by weight |
| $TiO_2$ | 0,3 by weight | $P_2O_5$ | 0-6 by weight |

| Clay, preferably composed as follows | | Clays containing manganese oxides, | |
|---|---|---|---|
| | | $MnO_2$ | 12-15% by weight |
| | | $SiO_2$ | 25-30 by weight |
| $SiO_2$ | 63-70% by weight | $Al_2O_3$ | 14-16 by weight |
| $Al_2O_3$ | 25-27 by weight | $Fe_2O_3$ | 25-28 by weight |
| $TiO_2$ | 0,6-0,7 by weight | CaO | 0,6 by weight |
| $Fe_2O_3$ | 0,5-0,6 by weight | MgO | 0,2 by weight |
| $Na_2O$ | 0,6-0,7 by weight | $K_2O$ | |
| | | | 2,5 by weight |
| $K_2O$ | 0,9-1,0 by weight | $Na_2O$ | |

| Clays containing ferric oxides, | |
|---|---|
| $SiO_2$ | 58,0% by weight |
| $Al_2O_3$ | 19,8 by weight |
| $Fe_2O_3$ | 8,1 by weight |

| -continued | |
|---|---|
| CaO | 0,1 by weight |
| MgO | 0,1 by weight |
| $K_2O$ | 5,3 by weight |
| $Na_2O$ | 3,5 by weight |
| annealing loss | 4,6 by weight |

Further coating materials used in accordance with the present invention are phosphates, borates and silicates, which are applied individually or in a mixture.

When applying the coating material onto the grain surface in accordance with the present invention it has proved advantageous to moisten the abrasive grain.

The following wetting agents are used by the present invention:

aqueous solutions of silicates, phosphates and borates,
phosphoric acids,
boric acids,
silicic acids,
organic Si-compounds, such as ethyl- and methyl polysiloxane.

It is essential to choose coating and wetting materials which are suitable for producing on the abrasive grain a rough, macroscopically closed coating which sporadically contains the above-mentioned microcracks. It is further essential that in spite of the high temperatures during the heat treatment no undesired intense edge corrosion occurs on the abrasive grain, which would considerably deteriorate its abrasive properties. A slight surface etching of the abrasive grains is indispensable, however, as such etching allows the formation of a chemical layer (cf. drawing). The wetting agents have to be used in suitably low concentrations.

In the following five embodiments of the present invention will be described:

The FIGURE of the drawing shows in accordance with embodiment 4 the abrasive grain 1 (normal corundum, $Al_2O_3$), an adjacent galaxite intermediate layer $MnAl_2O_4$ 2 and a sintered layer of manganese oxide grains 3 in a glass matrix 4. The intermediate layer 2 forms a chemical as well as a mechanical bond with the corundum 1 and the actual coating layer 3. Microcracks due to $ZrO_2$, for example, are shown by the number 5.

The FIGURE of the drawing shows a schematic sectional view of the boundary layer of an abrasive grain.

| Embodiment 1: | | |
|---|---|---|
| $Al_2$ (normal corundum) $\approx$ 700 $\mu$m | | 96,5% by weight |
| Wetting agent, as mentioned | | 1,0 by weight |
| Kaolin (grain size < 5 $\mu$m) | | 1,1 by weight |
| $Al_2O_3$ (grain size < 10 $\mu$m) | | 1,4 by weight |
| Embodiment 2: | | |
| $Al_2O_3$ (normal corundum) $\approx$ 700 $\mu$m | | 96,45% by weight |
| Wetting agent, as mentioned | | 1,3 by weight |
| high-melting frit < 38 $\mu$m | | 1,25 by weight |
| $MnO_2$ (grain size < 10 $\mu$m | | 2,0 by weight |
| Embodiment 3: | | |
| $Al_2O_3$ (normal corundum) $\approx$ 700 $\mu$m | | 95,5% by weight |
| Wetting agent, as mentioned | | 1,3 by weight |
| Clay < 5 $\mu$m | | 1,2 by weight |
| $MnO_2$ < 10 $\mu$m | | 2,0 by weight |
| Embodiment 4: | | |
| $Al_2O_3$ (normal corundum) $\approx$ 700 $\mu$m | | 95,55% by weight |
| Wetting agent, as mentioned | | 1,2 by weight |
| Frit (grain size < 38 $\mu$m) | | 1,25 by weight |
| $MnO_2$ (grain size < 10 $\mu$m) | | 1,8 by weight |
| $ZrO_2$ (grain size < 10 $\mu$m) | | 0,2 by weight |
| Embodiment 5: | | |
| $Al_2O_3$ (normal corundum) $\approx$ 700 $\mu$m | | 96,8% by weight |

| | -continued | |
|---|---|---|
| Wetting agent, as mentioned | | 1,0 by weight |
| Kaolin (grain size < 5 μm) | | 1,1 by weight |
| SiC (grain size < 20 μm) | | 1,1 by weight |

Preferably after being moistened the abrasive grain is mixed with the fine ground coating material in a conventional mixer. It is then coated and subsequently burned in a rotary tubular kiln at a temperature of between 1250° C. and 1350° C., whereby the heat treatment should not exceed 2 hours and last over a period of between 20 and 45 minutes, for example.

In order to find out the influence of the treatment of the abrasive grain on the strength behaviour of a finished abrasive article, specimens of the below-indicated composition were made. Their dimensions were 120×10×15 mm for testing the bending yield strength and 10×10×15 mm for testing the compressive yield strength. They were compressed to a compressive density of $d_o = \ldots 2{,}79$.

| | |
|---|---|
| Grain size ≈ 700 μm | 50% by volume |
| Phenolic resin (solid:liquid = 4:6) | 30% by volume |
| Filler (cryolite) | 15% by volume |
| (Pores) | 5-10 by volume |

Hardening was carried out at a temperature of 190° C. over 54 hours.

Specimens (severing disks—400×45×32 mm) composed as indicated above were made of untreated, conventionally annealed and coated normal corundum and of normal corundum treated in accordance with the present invention and then tested. In the tests round profiles φ 30 mm of constructional steel were severed. The results obtained in these comparative tests are listed in the following table:

| Grain | Bending yield strength kN/mm² | Compressive yield strength kN/mm² | G-factor Abrasive ratio |
|---|---|---|---|
| untreated normal corundum | 5200 | 13 300 | 3,0 |
| conventionally coated and annealed normal corundum | 6000 | 16 600 | 3,7 |
| normal corundum treated in accordance with the present invention | 7100 | 17 300 | 4,1 |

G-factor = Ratio between severed cross-sectional work piece surface and worn disk surface (disk abrasion)

What is claimed is:

1. A method of improving abrasive grains of a grinding disc, the abrasive grains made predominantly of Al₂O₃ with impurities including titanium oxide, comprising: coating the abrasive grains with a ceramic material mixed with metallic oxides capable of giving up nascent oxygen when heated, coating the abrasive grain by fusing the coating onto the abrasive grain at a temperature of between 1,250° and 1,350° C. over a period of between 15 minutes to 2 hours, the ceramic coating being at least partially melted onto the abrasive grain simultaneously with a change of the titanium oxide from the trivalent into the quadrivalent degree of oxidation.

2. A method according to claim 1 wherein said heat treatment is carried out over a period of between 20 minutes and 45 minutes.

3. A method according to claim 1 wherein metallic oxides, preferably ferric oxides and/or manganese oxides and/or chromium oxides are admixed to the coating material.

4. A method according to claim 1 wherein substances of a high coefficient of expansion, are admixed to the coating material.

5. A method according to claim 1 wherein kaolin is used as the coating material.

6. A method according to claim 1 wherein said abrasive grain is moistened by means of an aqueous solution of borates prior to the coating process.

7. A method according to claim 1 wherein said abrasive grain is moistened prior to the coating process by means of phosphoric acid, boric acid or silicic acid.

8. A method according to claim 1 wherein said abrasive grain is moistened prior to the coating process by means of an organic Si-compound.

9. A method according to claim 1 wherein 0.5–1.5 weight percent of SiC, referred to the amount of abrasive grain, are admixed to the coating material.

10. A method according to claim 1, wherein said ceramic and metallic oxides mixture is chosen from the group consisting of: inorganic silicates, clay, high melting glass frits, inorganic borates, and inorganic phosphates.

11. A method according to claim 1, wherein said ceramic and metallic oxides mixture comprises a clay containing at least one of ferric oxides, manganese oxides and chromium oxides.

12. A method according to claim 4, wherein said substances consist of ZrO₂.

13. A method according to claim 1, wherein said metallic oxides include in addition a material having high coefficient of expansion with respect to said ceramic material whereby cracks are formed in the coating.

14. A method according to claim 1, including in addition the steps of: mixing a bonding material with the coated abrasive grains, and a filler, placing the thus-formed mixture into a form and submitting the form and thus-formed mixture to a temperature of above 195° C. to cure the binding material and form the grinding disc.

15. A method according to claim 14, wherein the binding material comprises a phenolic resin, the filler material comprises cryolite.

16. A method according to claim 1, wherein the titanium oxide forming impurities in the abrasive grain before the abrasive grain is heated comprises Ti₂O₃ which changes to the titanium oxide of TiO₄ after the abrasive grain is heated.

* * * * *